United States Patent [19]

Rodahl et al.

[11] 4,145,854

[45] Mar. 27, 1979

[54] LOAD-CARRYING BUILDING STRUCTURE PARTICULARLY CEILINGS, FLOOR AND THE LIKE

[75] Inventors: Torbjorn Rodahl, Oslo; Finn Naess, Neosddtangen, both of Norway

[73] Assignee: Plan-Tek A/S, Norway

[21] Appl. No.: 835,187

[22] Filed: Sep. 21, 1977

Related U.S. Application Data

[63] Continuation-in-part of Ser. No. 648,823, Jan. 13, 1976, abandoned.

[30] Foreign Application Priority Data

Jan. 16, 1975 [NO] Norway ............................. 750128
Nov. 18, 1975 [NO] Norway ............................. 753873

[51] Int. Cl.² ........................................... E04C 3/10
[52] U.S. Cl. .................................. 52/228; 52/602
[58] Field of Search ..................... 52/228, 227, 602

[56] References Cited

U.S. PATENT DOCUMENTS 3,861,100  1/1975  Fatosme et al. ...................... 52/227

FOREIGN PATENT DOCUMENTS 253219  5/1963  Australia ............................. 52/228

*Primary Examiner*—Alfred C. Perham
*Attorney, Agent, or Firm*—Robert E. Burns; Emmanuel J. Lobato; Bruce L. Adams

[57] ABSTRACT

A load-carrying building structure, particularly ceilings and floors, comprising an assembly of prefabricated box-shaped components made from appropriate non-viscoelastic material like wood, steel and concrete. The box-shaped components are held together to form a rigid structure by means of tensioning members, a plurality of rods made from high quality steel arranged in at least two crossing directions. The rods are positioned and tensioned to such a degree that the tensile stresses in the structure due to dead load and live load are entirely eliminated by the compression stresses brought to the structure by the tensioning members. The mentioned boxes are thin-walled with a ratio between length: thickness of at least 30:1, and the ratio between depth: length is between 1:1 and 1:4.

9 Claims, 2 Drawing Figures

LOAD-CARRYING BUILDING STRUCTURE PARTICULARLY CEILINGS, FLOOR AND THE LIKE

This application is a continuation-in-part of our application Ser. No. 648,825 filed Jan. 13, 1976, now abandoned.

The present invention relates to a load-carrying building-structure particularly ceilings and floors, comprising prefabricated box shaped components made from appropriate non-viscoelastic material like wood, metal and concrete, held together by prestressed tensioning members to form a rigid structure.

In order to obtain an industrial and more rational fabrication of buildings, the aim of the building-industry is to increase the multitude of prefabricated components in the building. The accuracy and esthetics of the prefabricated components are overall better than the ones cast in — situ.

The widely used prefabricated components are wall-elements, front panels and the like, while ceilings and floors to a great extent have been cast in — situ.

In U.S. Pat. No. 3,861,100 the patentees have described a prefabricated construction forming ceilings and floors, comprising box shaped components held together by crossing rods to form a plane structure. The structure has, however, a small load-carrying capacity due to the fact that the rods are tensioned to hold the components together only, and the structure does not work like a prestressed structure. The stress in the rods increases as the load on the structure increases.

From the Australian Pat. No. 253219 is likewisely known a structure comprising boxshaped components held together by crossing steelrods. The box-walls have small depth and are thick, and the structure is much like an ordinary rib-slab. The rods are not prestressed according to ordinary building-technology, but are stretched by means of components mobile perpendicularly to the rod-direction, in order to give the rod a curvature.

The intention with the present invention is to obtain by using box shaped building-components of low weight, a simple and cheap building-structure, particularly ceilings and floors, with the ability of carrying extremely high loads compared to its low weight.

This is according to the invention obtained by a load-carrying building structure, particularly ceilings and floors, comprising prefabricated box shaped components made from appropriate non-viscoelastic material like wood, metal and concrete, held together to form a rigid structure by means of tensioning-members. The tensioning-members being high quality steel rods arranged in at least two crossing directions and positioned and tensioned to such a degree that tensile stresses in the structure due to its dead load and live load are entirely eliminated. The intention is also fulfilled by the fact that the mentioned box components are thin-walled with the following ratios:

$$\frac{\text{length}}{\text{thickness}} \text{ at least } \frac{30}{1} \text{ and } \frac{\text{depth}}{\text{length}} \text{ between } \frac{1}{1} \text{ and } \frac{1}{4}.$$

The rods are tensioned by means of hydraulic equipment and anchored by means of anchoring heads at the outmost of the structure. A preferred form of fabrication having the boxes made with one closed side, i.e. with the box bottom turning up.

No other means of connections exist between the boxes, which are entirely held together by friction.

Another feature of the invention is that the rods are placed in channels on the box wall so that the center-lines of the rods are positioned in the connector plane of the boxes.

The boxes can be prefabricated totally independent of the site and due to the thin walls the boxes are very light and easily transported.

During the fitting at site no temporary supporting is needed. The boxes can for instance be prestressed on the ground in sections, long enough to span between the original supports. These sections are craned and placed side by side, and after the ceiling or floor is totally covered the prestressing is performed in the secondary direction.

In the following the invention will be more accurately described referring to the enclosed drawings.

The building structure consists according to the invention of box shaped components 1, which in the shown fabrication is open below, but it is obviously within the scope of the invention to close both sides if appropriate. The boxes consist of four walls 2, 3, 4 and 5 together with the bottom 6. The walls of the boxes are thin in relation to the length and depth, therefore are the ratios:

$$\frac{\text{length}}{\text{thickness}} \text{ at least } \frac{30}{1} \text{ and } \frac{\text{depth}}{\text{length}} \text{ between } \frac{1}{1} \text{ and } \frac{1}{4}.$$

The bottom 6 can have the same thickness as the box walls.

Figure 1:
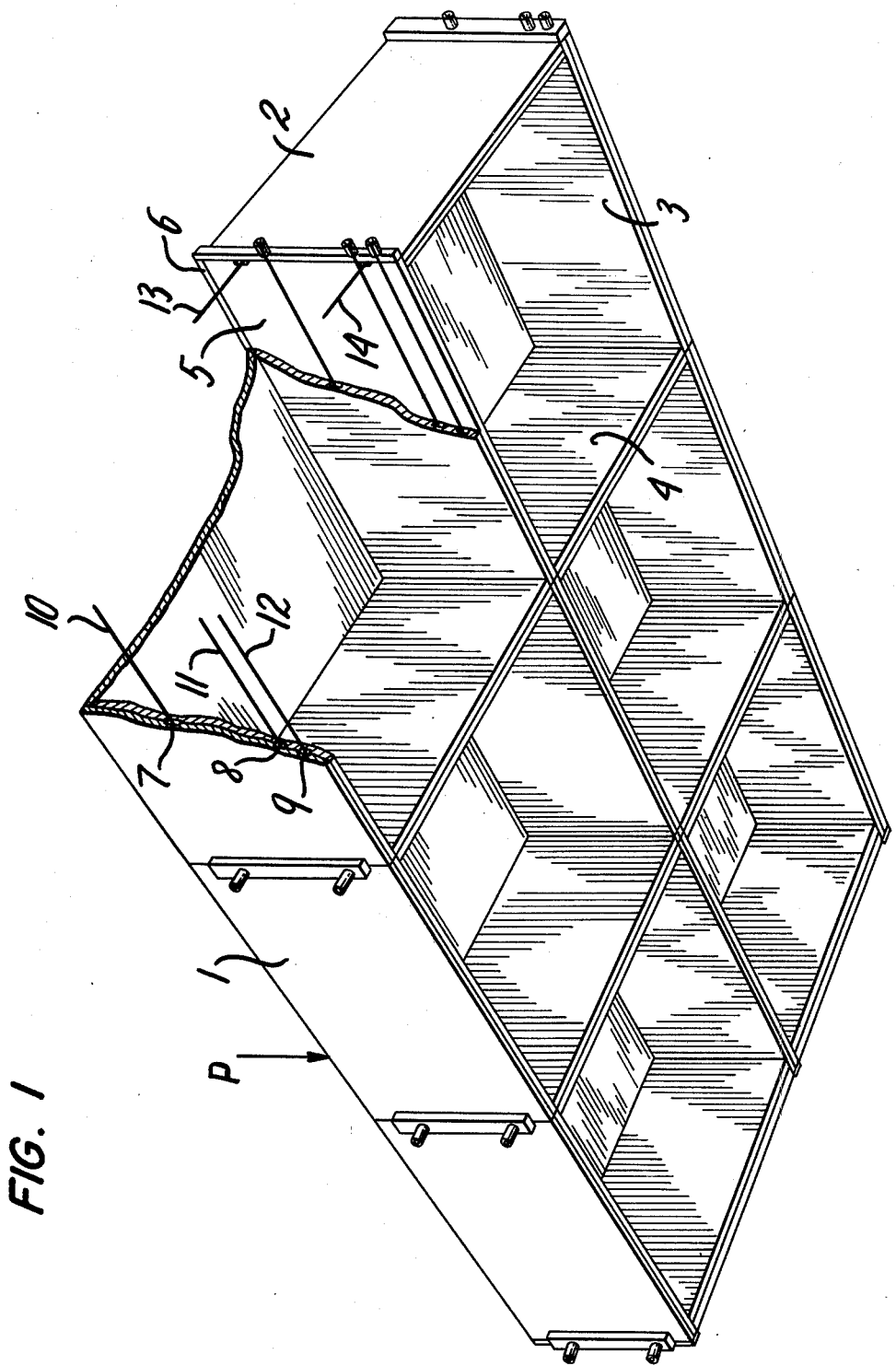
FIG. 1 shows a part of a ceiling-structure seen from below.
Figure 2:
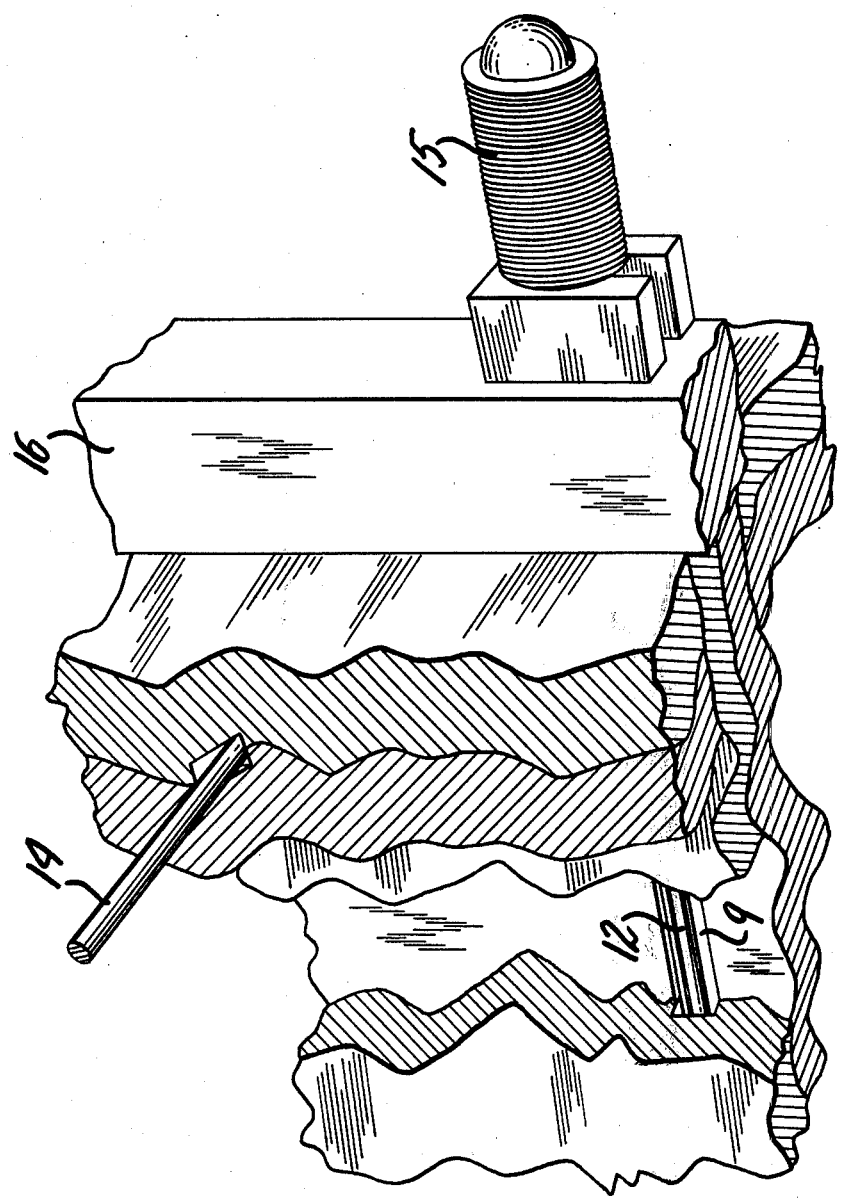
FIG. 2 shows in detail the anchorage of a steel rod.

As shown in FIG. 1 the boxes are positioned tightly together side by side. In the box walls' outer sides are arranged a number of channels 7, 8 and 9 parallel to the bottom 6. When the boxes are assembled side by side the channels in the intersecting boxes will create closed channels through which the steel rods are placed, for instance the rods 10, 11 and 12 in one direction and for instance the rods 13 and 14 in the other direction. These rods are hydraulically jacked to extremely high tensile forces and anchored by means of the anchorage heads 15. The tension brought upon the rods is of such a degree that the tensile stresses in the structure due to dead load and live load are entirely eliminated. A load P working on top of the structure will cause tensile stresses in the lower parts of the structure, but due to the tension in the rods 11 and 12, these parts of the structure are in advance compressed to a degree equal to the tensile stresses caused by the maximum load P. The stress in the bottom fibres will therefore be 0 when the structure is fully loaded, and at varying loading within maximum load tensile stresses will never occur. The stress in the prestressing rods will be constant and equal to the stress brought upon when jacked, at all loading within the design load.

To prevent crushing of the box walls in the position of the anchorage heads 15, small steel plates 16 are placed between the box wall and the anchorage heads. Each of the plates has a plurality of holes to receive end portions of rods both above and below the neutral plane of the structure. Moreover as seen in the drawings, the box walls which form the outer walls of the structure and on which the anchorage plates 16 bear are of double thickness.

Regarding the term "prestressed", reference is made to Code Practice for The structural of use of concrete, issued by the British Standard Institution, 2 Park Street, London WIA2BS, identified as CP110: Part 1: November 1972 (see page 15). According to the definition of Class 1 prestressed concrete there should be no flexural tensile stresses under design loads.

Prestressing of the structure is not possible without the use of high quality steel rods. When calculating the prestressing force, allowance should be made for the appropriate losses of prestress resulting from relaxation, shrinkage and creep of the materials. To make these losses small as compared to the total prestressing force, it is necessary to use a steel grade which it is possible to strain more than the total contraction.

Another important consideration in achieving a prestressed structure is force transmittance. In order for a prestressed structure to work as described above, it is necessary to transmit considerable concentrated compression forces. In the example illustrated in the drawings, this is achieved by the steel plates 16 which are placed between the box wall and the anchorage heads. If a structure is compressed but the necessary bearing capacity is not provided, the structure cannot be characterized as a prestressed structure.

If a structure is screwed or pressed together by means of ordinary construction steel having the characteristics of small strain and small cross sectional stress, the structure — if of small weight — can be loaded to a small extent and the load will be carried by the applied compression. However, the structure cannot be characterized as a prestressed structure because its capabilities are quite different from a prestressed structure as described above.

Moreover, the location of the rods in the structure is of great importance. By definition, a characteristic of a prestressed structure is the elimination of all tensile stresses. The criteria is obtained by the use of high quality steel prestressing rods. From statics the ideal situation, i.e. the position of the rods and the corresponding prestressing force in the rods can be computed.

To simplify the explanation we can think in terms of a resultant force. Assuming that a number of rods are positioned at different distances from the neutral axis and are tensioned differently, the forces can be represented by a resultant force R acting on the cross section with a distance Z from the neutral axis. The moment R · Z will give the stress distribution in the cross section. The stress will be tensile in the top of the section and compressive in the bottom of the section if R is positioned below the neutral axis and conversely will be compressive on top and tensile in the bottom if R is positioned above the neutral axis. Thus the position of the prestressing rods is as important as the magnitude of the prestressing force.

Therefore, in the case of a freely supported plate-structure with known dead load and known working load, the tensile stress in the bottom fiber of the structure due to the design load can be computed. Thus tensile stress must be eliminated by the prestressing, i.e. since the tensile stress occurs in the bottom of the structure, the rods must be positioned so as to obtain a resulting force R acting below the neutral axis in order to induce a compressive stress in the bottom of the structure which is greater than the tensile stress induced by the design load.

From this point of view, the rods would be positioned as far below the neutral axis as possible but it is important to remember that the prestressing will give a tensile stress in the top which is not to be greater than the compressive stress induced in the top of the structure by the dead load in order to be able to induce full prestressing force before the working load is applied to the structure.

From this explanation it will be clear that the position of the rods and the prestressing forces are not constant factors but the two terms are equally of great importance from a structural point of view and have to be computed for any particular design.

Up to now we have discussed the rods extending in one direction only, but in accordance with the invention rods extend in at least two directions. The position of the rods and the prestressing force are equally important in all directions.

The first stage of design is to select a structural system, i.e. how to transmit the loads through the structure onto the supports. In the case of a freely supported plate structure as shown in FIG. 1, the system chosen is one with a main direction and a secondary direction. Therefore, there are more rods in the main direction than in the secondary direction and hence the positioning is different.

In summary the invention is a structure comprising box-shaped elements held together by prestressing in order to avoid tensile stresses in the structure. The prestressing needed is obtained by computing the position of the rods, the number of rods, the different forces in the rods and the cross sectional size of the rods which in order to simplify the construction is usually equal for all of the rods. This can be calculated by statics when the actual conditions, i.e. span, load and the dimensions of the box-shaped components are known.

An actual example of construction in accordance with the invention is given by the ceiling structure of a sewage treatment plant having the following data:

| Structural system: | Freely supported |  |
| --- | --- | --- |
|  | ,main span = 14.4 m. |  |
|  | ,secondary span = 21.6 m. |  |
| Box dimensions: | Side = 1200 mm. |  |
|  | Depth = 900 mm. |  |
|  | Thickness = 19 mm. |  |
| Material | Plywood |  |
| Prestressing rods, |  |  |
| Main direction: | Number of rods = 4 |  |
|  | Rod diameter, all rods = 6 mm. |  |
| Rod Number | Position | Prestressing Force (kg) |
| 1 | 650 mm below the neutral axis | 1600 |
| 2 | 570 mm below the neutral axis | 1600 |
| 3 | 535 mm below the neutral axis | 1600 |
| 4 | 20 mm above the neutral axis | 2600 |
| Prestressing rods, |  |  |
| secondary direction: | Number of rods = 2 |  |
|  | Rod diameter = 6 mm. |  |
| Rod Number | Position | Prestressing Force (kg) |
| 1 | 550 mm below the neutral axis | 1800 |
| 2 | 60 mm above the neutral axis | 1500 |

The prestressed structures in accordance with the present invention have the following advantages under the action of high loading, i.e. long spans, crack-free structures and small deflections. It is thus possible in accordance with the present invention to provide load carrying building structures particularly ceilings and floors having important advantages over structures heretofore available.

Having described our invention, we claim:

1. Load-carrying building-structure, particularly ceilings and floors, comprising an assembly of prefabricated inverted-box-shaped components made of appropriate non-viscoelastic material like wood, steel and concrete and tensioning members holding said components frictionally together in a rigid structure, said inverted-box-shaped components being thin-walled with a length/thickness ratio of at least 30:1 and a depth/length ratio between 1:1 and 1:4, said tensioning members comprising a plurality of rods made of high quality steel arranged in at least two crossing directions and extending continuously between opposite sides of said structure, steel anchorage plates at opposite sides of said structure having holes through which end portions of said rods extend, said rods comprising rods both above and below a neutral plane of said structure, at least said rods below said neutral plane being as far as possible from said neutral plane, and said rods being positioned and tensioned between said anchorage plates to such degree that flexural tensile stresses in said structure due to design dead load and live load are entirely eliminated by the compressive stresses applied to the structure by said tensioning members to constitute a fully prestressed structure.

2. Load-carrying building-structure according to claim 1, in which said rods are tensioned by means of hydraulic equipment and anchored by anchorage heads bearing on said anchorage plates.

3. Load-carrying building-structure according to claim 1, in which said rods extend through channels formed by aligned grooves in abutting sides of said inverted-box-shaped components.

4. Load-carrying building-structure according to claim 1, in which at least in one of said crossing directions there are two rods one below the other below the neutral plane of said structure.

5. Load-carrying building-structure according to claim 1, in which each of said bearing plates has openings through which said rods both above and below said neutral plane extend.

6. Load-carrying building-structure according to claim 1, in which said inverted-box-shaped components have plane bottoms all lying in a common plane.

7. Load-carrying building-structure according to claim 1, in which the bottoms of said inverted-box-shaped components have a thickness approximately equal to that of the side walls.

8. Load-carrying building-structure, particularly ceilings and floors, comprising an assembly of prefabricated inverted-box-shaped components made of appropriate non-viscoelastic material like wood, steel and concrete and tensioning members holding said components frictionally together in a rigid structure, said inverted-box-shaped components being thin-walled with a length/thickness ratio of at least 30:1 and a depth/length ratio between 1:1 and 1:4, said tensioning members comprising a plurality of rods made of high quality steel arranged in at least two crossing directions and extending continuously between opposite sides of said structure, steel anchorage plates at opposite sides of said structure having holes through which end portions of said rods extend, said rods comprising rods both above and below a neutral plane of said structure, at least said rods below a neutral plane being as far as possible from said neutral plane, and said rods being positioned and tensioned between said anchorage plates to such degree that flexural tensile stresses in said structure due to design dead load and live load are entirely eliminated by the compressive stresses applied to the structure by said tensioning members to constitute a fully prestressed structure, the walls of said inverted-box-shaped components which form outer walls of said structure on which said anchorage plates bear being of materially greater strength and thickness than other walls of said components.

9. Load-carrying building-structure according to claim 8, in which said walls of said components which form outer walls of said structure have a thickness approximately twice the thickness of other walls of said components.

* * * * *